Sept. 9, 1969     A. P. SCHLIES     3,466,445
CONTAINER FOR RADIOACTIVE FUEL ELEMENTS
Filed Oct. 6, 1967
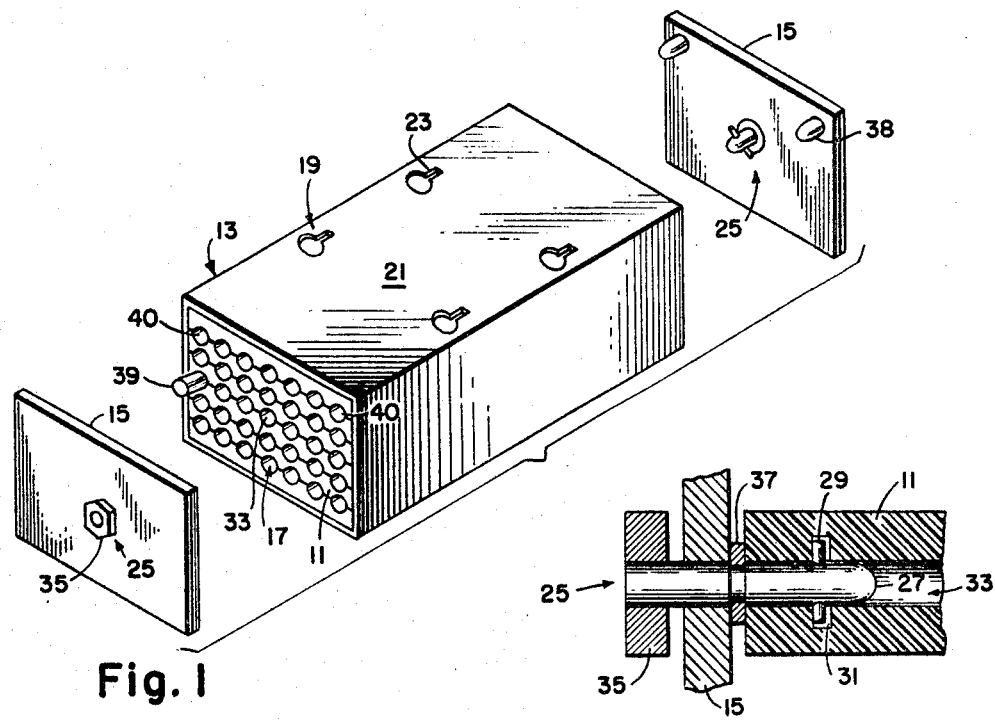
Fig. 1
Fig. 2
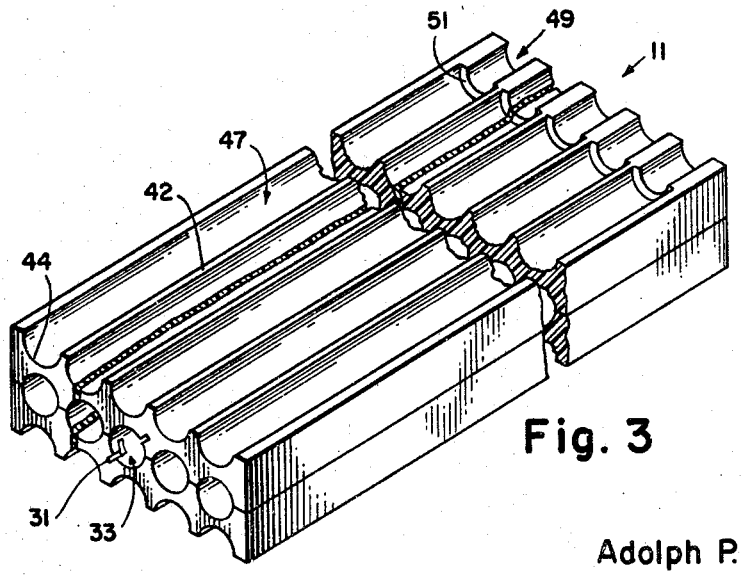
Fig. 3
Adolph P. Schlies
*INVENTOR.*
BY

United States Patent Office 3,466,445
Patented Sept. 9, 1969

3,466,445
CONTAINER FOR RADIOACTIVE FUEL
ELEMENTS
Adolph P. Schlies, Albuquerque, N. Mex., assignor to the
United States of America as represented by the United
States Atomic Energy Commission
Filed Oct. 6, 1967, Ser. No. 674,068
Int. Cl. G21f 5/00
U.S. Cl. 250—108                                3 Claims

ABSTRACT OF THE DISCLOSURE

A container for holding or transporting nuclear reactor fuel elements comprising a stack of neutron absorbing members having matching longitudinal grooves forming passageways in which the fuel elements may be separately supported and a housing for surrounding and confining the stack having means for engagement of a remotely operated handling device.

Background of invention

Reactor fuel elements must be stored and transported in neutron absorbent containers to minimize or avoid the possibility of criticality. Prior techniques for storing and handling the fuel elements have included a container or cask having a nest of individual aluminum tubes into which the fuel elements were individually inserted. The tubes were spaced apart in a rectangular array by means of bored end plates or tube sheets. Intermediate and outside the tube were positioned elongated, rodlike, neutron absorbing members generally in the middle of each quadrate array for minimizing the possibility of criticality. Each rodlike member comprised an aluminum conduit filled with aluminum and boron carbide chips.

This prior art container is difficult and complex to fabricate and assemble as a large number of aluminum tubes with the intermediate rod members must be individually aligned between the tube sheets. Furthermore, the rod members must be assembled by a complex, time consuming and consequently expensive process such as forming and filling suitable conduits with aluminum and boron carbide chips.

Although composed chiefly of aluminum, the prior art container is heavier than desirable also, its efficiency as a neutron absorber is not as high as could be in that the neutron absorber members do not completely encompass each individual fuel element. Furthermore, insertion and removal of fuel elements is not the optimum as the fuel elements do not readily slide along the inside surface of the aluminum tubes.

Summary of invention

Therefore it is an object of this invention to provide a light weight, readily assembled container for nuclear reactor fuel elements which allows complete enclosure of each individual element within a neutron absorbing substance.

It is a further object to provide a cask or container for nuclear reactor fuel elements which facilitates insertion and removal of the elements.

Various other objects and advantages will become apparent from the following description of one embodiment of the invention and the most novel features will be set forth thereafter in the appended claims.

As shown, the invention comprises a cask for containing nuclear reactor fuel elements comprising a stack or array of trays or members "filled" with a neutron absorber, each tray having generally semicylindrical grooves or indentations oppositely aligned with similar grooves or indentations in adjacent trays to form fuel element passageways or cells, and a housing for supporting and maintaining the shape of said stack during handling while permitting remote access to said fuel elements.

Description of drawings

The invention is illustrated in the accompanying drawing wherein:

FIG. 1 is a perspective view of the cask or container assembled with a stack of neutron absorbent members with the two end plates removed;

FIG. 2 is an enlarged cross-sectional view of the latch which holds the end plates on the container of FIG. 1; and FIG. 3 is a perspective view of two members removed from the container of FIG. 1.

Detailed description

FIG. 1 shows a cask including a plurality of neutron absorbent trays or members 11, each having longitudinal open sided grooves, stacked within a housing 13 to form cells or passageways 17 between the trays, and two end plates or lids 15 removed for inspection.

The housing and lids may be of aluminum which is light weight and to some extent may absorb thermal neutrons. The container may be designed to allow remote handling. For instance, a number of holes or slots 19 may be cut or punched through a major surface 21 in housing 13. Each hole may have a section of smaller diameter 23 at one end directionally consistent with the orientation of each other section of reduced diameter in the other holes. This arrangement allows interlocking engagement of a remotely operated handling device equipped with an appropriate tool having suitable mating prongs or protrusions such as ordinary bolts or screws with flanged ends which may be suitably inserted within the holes followed by longitudinal movement in the direction of the reduced diameter openings 23. The cask may then be lifted for transport.

The two end plates 15 may be identical and are positioned in FIG. 1 to show opposite sides. A suitable latching device, such as the rotary operated fastener 25 detailed in FIG. 2, may hold or fasten the lids to the housing. The fastener 25 may include a cylindrical shaft 27 having laterally projecting pins or bayonets 29 for engaging an equal number of helical bayonet slots 31 formed in adjacent trays at opposing indentations or grooves defining a cell or passageway 33. Cell 33 may be any cell vertically and laterally aligned with shaft 27 when end plate or lid 15 is properly assembled with housing 13. (See FIG. 3 for perspective of slots 31.) As shown two bayonets 29 and slots 31 may be used. The fastener shaft 27 may loosely pass through end plate 15 such that it may be rotated or operated by engaging handle or nut 35 with a mating tool in combination with a remotely operated handling device. A suitable retainer such as a clip ring 37 or a cotter pin may be used to rotatably fasten or hold handle 35 and shaft 27 to end plate 15 and facilitate remote assembly.

Fastener 25 and matching cell or passageway 33 may generally be disposed at the center of the cast end plate. To prevent end plate rotation one or more alignment pins or keys 38 may extend from the inside surface of lids 15 and fit into any of the passageways or cells formed between any pair of trays in the stack, preferably at the extremities of the trays, such as passageways or cells 40 in FIG. 1.

FIG. 3 shows a pair of synthetic resin material or plastic members 11 having embodied therein or "filled" with a suitable neutron absorbing material. Each tray may have grooves or generally semicylindrical indentations 47 longitudinally extending across surfaces of the trays. Special trays may be tailored for the stack extremities with grooves only on one major surface. The indentations, grooves, or slots, when supplemented by an oppositely disposing mating slot within an adjacent tray, form a plurality of cells or passageways 17, as shown, any one of which may be adapted to receive latch or fastener 25 or pins 38 as noted above. Each passageway 17 thus formed within the tray stack may accommodate or receive a fuel element or rod 39 (shown partially withdrawn from the cell in FIG. 1). Laterally intermediate each groove there may be a flat portion of face 42 which may be contiguously disposed toward a similar face on an adjacent member to substantially or completely encompass the fuel element with the plastic "filled" with the neutron absorbing material. The dimensions of ridge 42 and narrow portion 44 of the member intermediate grooves disposed in opposite major surfaces of the same tray may be equal and may exceed a minimum measurement determinable by those skilled in the art from the type and density of the neutron absorber used to "fill" the plastic member, and the nuclear characteristics of the fuel rods carried therebetween.

Neutron absorbing materials of various types may be used in the members as trays. Plastic trays contain hydrogenous materials which may slow down and absorb some neutrons. A known "filler" material having a large thermal neutron capture cross section, such as boron, cadmium, etc., may be used to enhance neutron absorption, but boron may be deemed preferable as it is deemed to not release high energy gamma on neutron capture.

The members 11 should have adequate strength to support on ridges 42 a complete tray stack with fuel elements. Sufficient filler such as boron may be mixed with the plastic to absorb or suitably reduce neutron radiation density having in mind the amount of "shielding" or neutron capture required to avoid criticality.

The trays 11 may be formed by mixing powdered boron with plastic containing a curing agent and then casting or extruding the trays into shape. Any suitable plastic or resin material may be used to form the trays such as epoxy, polyethylene, or polyurethane. Any of such plastics will form smooth surfaces which facilitate fuel element removal. Polyethylene is especially suited for extrusion and becomes harder during usage. The epoxy resins are well suited for casting as one of suitable viscosity may be selected such that the mold may be filled without entrained air pockets or voids which would locally reduce strength and boron density. For instance the epoxy epichlorohydrine treated with metaphenaline diamine for curing may be selected. The boron filler may either be in elemental or chemically combined state but if it is desirable to minimize weight, elemental boron may be used. Further weight reduction may be gained by introducing and uniformly dispersing phenolic Microballoons or microspheres into the plastic before casing. The Microballoons may be formed by any suitable process known to the art.

At one end of the semicylindrical indentations 47, a raised portion or inwardly extending projection 51 may be formed to retain the fuel elements or rods within the cells. Such raised portions or projections may be cast or molded onto the basic plastic tray or may be separate members or plugs made of for instance lead or a suitably filled plastic pressed or fitted into the tray grooves 47. The raised portions 51 may stop short of the full radius of the indentation or full diameter of the cell to provide an opening 49 through which the fuel elements may be remotely pushed with suitable tools or rods for removal.

The grooves or passageways formed therefrom need not necessarily be circular in cross section as shown but may be formed to any suitable configuration including elliptical or they may have a cross section which is generally triangular, rectangular or polygonal. Fuel elements of various shapes may be fitted into conformingly shaped cells or cells of different shapes which will conveniently receive them.

The invention provides a light weight easily assembled cask or container for nuclear reactor fuel elements which encloses each individual element with a neutron absorber. By use of the microspheres within the plastic trays a cask which is a fraction of the weight of prior art casks which utilize aluminum tubes may be provided. The trays and accordingly the cell walls may be smooth to minimize friction and to thus effect easy removal of the fuel elements.

It will be understood that various changes in the details, materials and arrangement of the parts, described herein may be made by those skilled in the art within the scope of the invention as expressed in the appended claims.

What is claimed is:

1. A container for nuclear reactor fuel elements comprising the combination of a plurality of separate members composed of synthetic resin material containing neutron absorbing material and stacked with contiguously disposed faces, each of said contiguous faces having a plurality of open sided grooves disposed toward adjoining grooves in the face of a contiguous member, said adjoining grooves cooperating with each other, to form a plurality of open-ended passageways for containing and completely encompassing individual nuclear reactor fuel elements, and a housing surrounding and confining said members in contiguous relationships.

2. A container as claimed in claim 1 adapted to be handled by a remotely operated handling device wherein said housing is provided with means for interlockingly engaging said handling device to lift said container, and said container having end plates each of which includes latching means cooperating with one of said passageways for securing said end plate to said housing, each latching means including connector means for interlockingly engaging said handling device for removing said end plates.

3. The container according to claim 1 wherein said passageways include an inwardly extending projection for supporting a fuel element within the passageway.

References Cited

UNITED STATES PATENTS 3,229,096  1/1966  Bonilla et al. _____ 250—108
3,056,028  9/1962  Mattingly.

OTHER REFERENCES

Nucleonics, April 1960, p. 112.

ARCHIE R. BORCHELT, Primary Examiner

U.S. Cl. X.R.

250—106